April 25, 1939.  P. N. MILLER  2,155,503
MOTOR VEHICLE
Filed Jan. 19, 1935
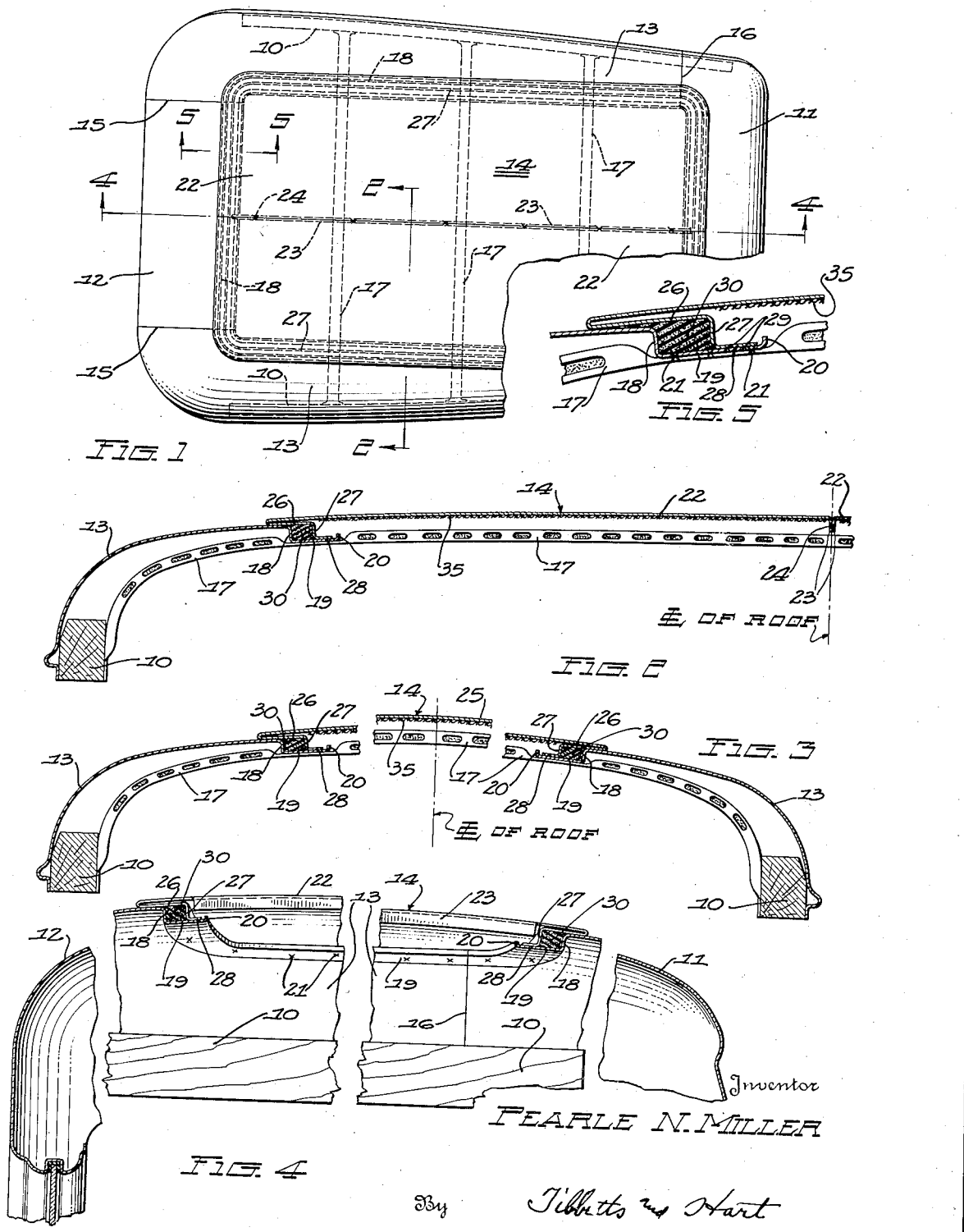
Inventor
PEARLE N. MILLER
By Tibbetts and Hart
Attorneys Patented Apr. 25, 1939

2,155,503

UNITED STATES PATENT OFFICE 2,155,503

MOTOR VEHICLE

Pearle N. Miller, Detroit, Mich., assignor to Packard Motor Car Company, Detroit, Mich., a corporation of Michigan Application January 19, 1935, Serial No. 2,499

3 Claims. (Cl. 296—137)

This invention relates to roof structures and more particularly to motor vehicle roof structures.

Motor vehicle roof structures usually include sheet metal panels which define a top opening closed by a composite top structure suitably secured and sealed to the panels. Such tops are usually assembled directly on the roof panels and consist of several layers of material, finishing strips and suitable securing means. Because of the composite nature of such tops and the time required to assemble the elements, manufacturing costs are considerably more than is desirable.

An object of the present invention is to provide a roof structure consisting of few parts which can be quickly assembled in final relation.

Another object of the invention is to provide a sheet metal roof structure which is rugged and capable of being manufactured at low cost.

A further object of the invention is to provide a metal roof structure which can be assembled without any particular regard for tolerances.

Still another object of the invention is to provide a sheet metal roof top structure secured permanently around its edges to a roof structure which is hinged longitudinally to allow slight movement thereof during body twisting movements.

Other objects of the invention will appear from the following description taken in connection with the drawing, which forms a part of this specification, and in which:

Fig. 1 is a plan view, partly broken away, of a motor vehicle roof structure embodying my invention.

Fig. 2 is an enlarged vertical sectional view taken on line 2—2 of Fig. 1.

Fig. 3 is an enlarged vertical sectional view similar to Fig. 2 illustrating a modified form of top structure.

Fig. 4 is an enlarged sectional view of the roof structure taken on line 4—4 of Fig. 1.

Fig. 5 is an enlarged fragmentary sectional view of the junction of the roof structure where the top overlies a panel taken on line 5—5 of Fig. 1.

Referring now to the drawing by characters of reference, 10 indicates the side roof rails of a motor vehicle body structure which are suitably supported by pillars (not shown) in a conventional manner. Carried on such rails is a roof structure consisting of front panel 11, rear panel 12, side panels 13 and a top unit indicated generally at 14. The side panels are welded to the rear panel along lines indicated at 15 and they are welded at the front ends to the front panel as indicated at 16. A plurality of longitudinally spaced listing strips 17 extend transversely of the roof structure and are suitably secured at their ends to rails 10. These strips also serve as the main support for the roof structure.

The edge portions of the end and side panels are bent similarly to form a continuous trough which defines a top opening adapted to be closed by the top unit. Such portions have a downwardly extending wall 18 terminating in a laterally extending wall or trough base 19 and a short flange 20 extends upwardly from such base. The bases of the side panel troughs rest on the listing strips and are permanently secured thereto by spot welding as indicated at 21. This arrangement and securing together of the panels as well as the securement of the panels to the listing strips provides a strong rugged roof structure preparatory to application of the top unit.

As shown in the preferred form of the invention, the top unit is formed of two longitudinally extending sheet metal strips 22 having their adjacent edge portions turned down forming flanges 23. These flanges terminate short of the ends of the strips and are secured permanently together by spot welding as indicated at 24, such securing means allowing some flexibility or hinging of the top along the abutting flanges. This form of top can yield slightly at the joint when there is twisting movement in the body and shearing action on the securing means is thus materially lessened. The adjacent edge portions of the strips 22 beyond the flanges are welded together. In the modified form of the top unit shown in Fig. 3, there is a single sheet of metal 25 instead of the two strips comprising the preferred form of top.

The edge portion of the top unit is doubled back in spaced relation beneath the top, as indicated at 26, and then bent downwardly to form wall 27 and then laterally inward to form a wall 28. The wall 28 is spaced below the outer surface of the top so that it will rest on the trough base 19 of the panels when the doubled back wall rests on the outer surface of the panels. When the unitary top is so applied the wall 28 is spot welded to the base 19 as indicated at 29. The wall 27 of the top structure and the panel wall 18 are spaced forming a chamber which is filled with material 30 having sealing characteristics. Such material is applied in sufficient quantity to not only fill the chamber but to also fill the adjacent space formed between the outer surface of the panels and the overlying doubled back wall of the top. With this form of top the outer surface is formed of a size to overlap the outer surface of the panels adjacent the opening so that the opening will be covered irrespective of manufacturing variances. Likewise the walls 28 and 19 will cooperate even though there are manufacturing variances and hence no particular precision is required to insure covering of the opening and leak proof sealing around the opening. It will also be noted that the welding of the top unit to the panels provides a simple, easily fabricated form of roof structure which is extremely rugged.

The bent under marginal portion of the applied roof structure is sufficiently flexible to give a limited extent with the attached panels without transmitting such motion from one panel to another through the overlying portion of the roof structure, in other words, the underlying portion of the roof structure is in effect a "bellows" connection between the panels and the overlying portion of the applied roof structure. Because of this "bellows" effect a panel and the attached marginal portion of the roof structure can move without transmitting such movement through the overlying roof portion to the opposite panel. The connection between the two sections of the roof structure is such that one can flex relative to the other so that a further "bellows" effect is present to prevent the overlying roof portion from transmitting motion from either side panel to the other in case the marginal flexure is not sufficient for this purpose. Distortion of a sheet metal body having its elements permanently fixed together is in this way materially reduced.

Fixed to the interior wall of the top unit is a layer of sound deadening material 35 which with the leak proofing material around the opening will prevent the drumming noise usually developed in all-metal roof structures.

Although the invention has been described in connection with specific embodiments, the principles involved are susceptible of numerous other applications which will readily occur to persons skilled in the art. The invention is therefore to be limited only as indicated by the scope of the appended claims.

What is claimed is:

1. A sheet metal roof structure for vehicles comprising front, rear and side metal panels defining a top opening and having their inner edge portions bent downwardly and then inwardly, an insertable sheet metal top for covering the opening having its edge portion doubled under in spaced relation and then bent downwardly and inwardly, the doubled under portion of the top resting on said panels outside of said downwardly bent edge portions, the downwardly bent portion of said top being spaced inwardly from the downwardly extending portions of the panels, the marginal inwardly extending portion of said top resting on the inwardly extending marginal portions of said panels and welded thereto, and a sealing compound filling the space between the doubled under and downwardly extending portions of said top and the adjacent surfaces of said panels, the under portion of said top being flexible to move a limited extent with any one of the panels to which it is fixed without transmitting such movement across the overlying portion of the top to the opposite panel.

2. A sheet metal roof structure for vehicles comprising front, rear and side metal panels defining a top opening, said panels having their inner edge portions bent downwardly and their marginal portions bent inwardly in a horizontal direction from the bent down portions, a sheet metal top having its edge portions doubled under in spaced relation and then bent downwardly and inwardly horizontally, the doubled under in spaced vertical relation portion of the top resting on said panels outside of said downwardly bent edge portions thereof and the horizontally extending marginal portions of said top resting upon the horizontal extending marginal portions of said panels, and means applied from the interior of the body for securing the horizontally extending marginal portions of said top and said panel permanently together, the bent under portion of said top being flexible to move vertically a limited extent with the panel to which it is fixed without distorting the overlying portion of the top.

3. A sheet metal roof structure for vehicles comprising front, rear and side metal panels defining a top opening, said panels having their inner edge portions bent downwardly and then inwardly in a horizontal direction, a sheet metal top formed of two sections permanently secured together approximately on the horizontal center line of the body, said top having its edge portions doubled under in spaced relation and then bent downwardly and inwardly in substantially horizontal direction, the doubled under portion of the top resting on said panels outside of said bent down portions thereof and the marginal horizontal portions of said top resting upon the marginal horizontal portions of said panels, and means for permanently securing together the adjacent horizontal marginal portions of the top and the panels, the doubled under portion of said top being movable vertically a limited extent with the panels without transmitting movement to the overlying portion of the top.

PEARLE N. MILLER.